US008358587B2

(12) United States Patent
Han et al.

(10) Patent No.: US 8,358,587 B2
(45) Date of Patent: Jan. 22, 2013

(54) LOCAL WIRELESS COMMUNICATION SYSTEM AND METHOD EMPLOYING FREQUENCY-VARIABLE SIGNAL DETECTION

(75) Inventors: Sang-Min Han, Gyeonggi-do (KR); Jong-Sik Lim, Daejeon (KR); Dal Ahn, Chungcheongnam-do (KR); Won-Sang Yoon, Seoul (KR); Young-Sik Kim, Seoul (KR)

(73) Assignee: Soonchunhyang University Industry Academy Cooperation Foundation, Chungcheongnam-do (KR)

( * ) Notice: Subject to any disclaimer, the term of this patent is extended or adjusted under 35 U.S.C. 154(b) by 426 days.

(21) Appl. No.: 12/636,682

(22) Filed: Dec. 11, 2009

(65) Prior Publication Data
US 2011/0032915 A1 Feb. 10, 2011

(30) Foreign Application Priority Data

Aug. 4, 2009 (KR) .................. 10-2009-0071528

(51) Int. Cl.
*G08C 15/00* (2006.01)
*H04J 1/16* (2006.01)
*H04B 1/18* (2006.01)

(52) U.S. Cl. .................. 370/252; 370/431; 370/480

(58) Field of Classification Search .................. None
See application file for complete search history.

(56) References Cited

U.S. PATENT DOCUMENTS

| 2003/0078037 | A1* | 4/2003 | Auckland et al. ............. 455/422 |
| 2005/0078225 | A1* | 4/2005 | Yen ................. 348/732 |
| 2006/0079272 | A1* | 4/2006 | Yan ............. 455/552.1 |
| 2007/0042733 | A1* | 2/2007 | Tomioka ................ 455/179.1 |
| 2008/0159208 | A1* | 7/2008 | Kloker et al. ................. 370/329 |
| 2009/0154485 | A1* | 6/2009 | Park et al. ...................... 370/438 |
| 2009/0274228 | A1* | 11/2009 | Nakayama ................... 375/260 |
| 2009/0280748 | A1* | 11/2009 | Shan et al. ................. 455/67.11 |

FOREIGN PATENT DOCUMENTS

| KR | 10-2003-0059838 | 7/2003 |
| KR | 10-2008-0102069 | 11/2008 |

* cited by examiner

*Primary Examiner* — Chirag Shah
*Assistant Examiner* — Ashley Shivers
(74) *Attorney, Agent, or Firm* — Rabin & Berdo, P.C.

(57) ABSTRACT

A system for performing a local wireless communication using a predetermined frequency band divided into a plurality of channels. The system includes a hub for scanning each channel to identify available one of the plurality of channels and transmitting data over the available channel. The system further includes a sensor set to start to operate when the sensor detects a signal within the predetermined frequency band. The sensor spectrum-senses the signal of the frequency band for each channel, and analyzes a header of packet data for each channel, and receives and processes the packet data if the signal is identified to have a designated code.

7 Claims, 7 Drawing Sheets

LOCAL WIRELESS COMMUNICATION SYSTEM AND METHOD EMPLOYING FREQUENCY-VARIABLE SIGNAL DETECTION

This non-provisional application claims priority under 35 U.S.C. §119(a) on patent application Ser. No. 10-2009-0071528 filed in Republic of Korea on Aug. 4, 2009, the entire contents of which are hereby incorporated by reference.

BACKGROUND

1. Technical Field

The present invention is directed to a wireless communication field, and more specifically to a local wireless communication system and method employing frequency-variable signal detection, which may secure a communication channel in a given frequency band by using a spectrum-sensing method.

2. Related Art

In recent years, wireless communication systems have been rapidly grown up owing to the commercialization of mobile telecommunication and technological convergence.

Unlike long-haul telecommunication technologies such as satellite or mobile communications, local wireless access technologies, especially RF/Microwave systems, are different from an image of current simple up/down conversion systems and pursue technological innovation mainly employing wideband, low-power consumption, and efficient distribution of frequency resources.

A good example of the wideband technology is UWB (Ultra Wideband) that has been enjoying its fame as one of highly-ranked wireless technologies for the last ten years.

Since a standard frequency band for UWB was assigned by U.S. FCC, the research and development has been focusing on both IEEE 802.15.3a associated with HR (High-Rate) UWB technologies and IEEE 802.15.4a associated with LR (Low-Rate) UWB.

Wide band technologies in the field of RF/Microwave generally have been treated for simple increment of the bandwidth for system applications. Thus, it has been overlooked for technical environments as a key to technological success, which may be achieved only by researching circuit technologies in point of view of systemic considerations.

Representative HR-UWB camps are the MBOA (multiband OFDM Alliance), which increases a signal bandwidth of OFDM (Orthogonal Frequency Division Multiplexing) as much as necessary for high-rate communications, and DS-CDMA that spreads and uses the entirety of 2 GHz frequency band. In particular, IEEE 802.15.4a standard for LR_UWB is now excluded from next generation USN (Ubiquitous Sensor Network) terminal candidate in a standard competition, because it was shifted to a high-capability, high-cost standard based on IR (Impulse Radio) by high-accuracy additional functions.

Second, RF/Analog circuit-related technologies have been rapidly developed for the last twenty years by overcoming problems with current wireless terminals, such as bulky size and large power consumption thanks to the integration technologies.

At the same time, circuit and system design technologies for low-power applications are required for BioRF, RF Sensor Node, and so on from the demand of recent diversified system environments and circuit technologies.

Pico ($10^{-12}$) watt RF transceiver and network technologies have been co-researched for sensor nodes in BWRC(Berkeley Wireless Research Center) of UCB (University of California at Berkeley), a representative of the lower power RF technology research organization.

This project named "PicoRadio" partially enjoyed a success in developing low-power RF devices using MEMS and energy scavenging technology that collects energy from natural sources, however, such a success is still limited in developing a few devices and evaluating the possibility of energy scavenging technology.

Accordingly, a new project called "pJoule" has been launched to continue researching low-power, high-efficient systems.

Third, "cognitive radio (CR)" system technology originating from a point of view of efficient reuse of limited frequency resources, primarily focuses on system hardware in which a terminal determines whether to use a spectrum of a wireless transmitting channel to dynamically allocated a channel.

This technology can save costs as well as effectively operate wireless channels by efficient reuse of a frequency resource that is considered as the only medium in wireless communications.

Further, it has an advantage of the capability of developing a new wireless application using a spectrum sensing technology.

However, most of spectrum sensing technologies, which are core technologies of a CR system and have been suggested and studied in IEEE 802.22 standard, have a procedure of down-converting a signal received by a terminal to a base band to identify whether there is a valid signal on a channel by a digital processor or not.

It has some demerits like long processing time and high energy consumption.

Meanwhile, the GEDC (Georgia Electronic Design Center) of Georgia Tech, USA, which is the only institute with spectrum sensing technology in RF Front-End, suggested a technology of identifying whether a spectrum is used or not at relatively high speed through a dual loop process of "Coarse sensing" and "Fine Sensing".

In Korea, it has been attempted by ETRI, Samsung Electro-Mechanics together with a professor group of GEDC (J. Lasker et al.) to introduce a dual loop technology to CR systems.

Because of adopting precise and accurate dual evaluation, the spectrum sensing technology of GEDC is appropriate for relatively complicated terminal environment requiring high-cost, high-class services, but not for local low-power small systems such as USNs.

SUMMARY

According to an aspect of the present invention, there is provided a local wireless communication system and method employing frequency-available signal detection, which may secure an unused channel in a given bandwidth over a local communication network by a sensing method, thereby minimizing interference between channels in an unlicensed frequency band.

According to another aspect of the present invention, there is provided a local wireless communication system and method employing frequency-available signal detection, in which a sensor node may rapidly detect a received frequency channel in a RF bandwidth, thereby allowing for low-power communications.

In an aspect of the present invention, a local wireless communication system employing frequency-variable signal detection includes: at least hub for dividing at least part of a frequency band into a plurality of channels, identifying available one of the plurality of channels, modulating data, and transmitting the modulated data over the available channel; and a plurality of sensors, each starting operation when a signal of the frequency band, spectrum-sensing the signal of the frequency band for each channel, analyzing a header of packet data for each channel, and receiving and processing the packet data if the signal is identified to have a designated code.

The sensor may include a band detector that detects in real time a received signal, and supplies the received signal to a processor of the sensor as power to turn on the processor.

The sensor further may include a frequency-variable detecting unit that among channel signals received at the frequency band, detects a channel signal corresponding to a resonant frequency generated according to a control signal.

The frequency-variable detecting unit may include a resonator that variably generates a resonant frequency generated according to the control signal, and a signal detector that detects each channel signal of the frequency band corresponding to a resonant frequency generated by the resonator.

The signal detector may be a varactor diode that detects a signal carried on the frequency channel according to a variable resonant frequency of the resonator.

Upon data modulation through the channel identified to be available, the hub may employ OOK (On Off Keying) or ASK (Amplitude Shift Keying) as its modulation scheme.

The hub may further includes a controller that may generate a control signal to perform spectrum-sensing on signals received on the frequency band for each and every channel to find a channel available for data transmission.

In another aspect of the present invention, a local wireless communication method employing frequency-variable signal detection, in which at least one hub performs local wireless communications with a plurality of sensors at a predetermined frequency band includes: dividing at least part of the frequency band into a plurality of channels; detecting a signal over each channel in the frequency band to identify whether to use each channel when the hub transmits data to at least one sensor; if it is identified there is available unused channel, selecting the unused channel as a data transmission channel; modulating data subjected to transmission; and transmitting the modulated data to the sensors over the transmission channel.

Said identifying whether to use each channel may include generating a predetermined control signal, receiving the generated control signal to generate a resonant frequency, and detecting a channel signal corresponding to the generated resonant frequency.

The control signal may be a DC signal that may control the capacitance C of the variable condenser.

Said detecting the channel signal may include detecting a signal carried on a corresponding frequency channel according to a variable resonant frequency of the resonator by the control signal.

The local wireless communication method may further include detecting in real time a received signal by a band detector of the sensor; if there is a signal in a corresponding band, supplying the received signal to a process of the sensor as power to turn on the process; scanning the signal received at the frequency band for each channel through a spectrum sensing method to detect a signal for each channel; and analyzing a header of packet data from the signal detected for each channel to receive and process the packet data if the signal is identified to have a designated code.

According to the present invention, since a received frequency channel in a given band over a local communication network is detected in a RF bandwidth by a spectrum sensing method, low-power sensors may be implemented.

According to an aspect of the present invention, since a hub dynamically may secure a communication frequency channel over a local communication network, interference between channels in an unlicensed frequency band may be minimized.

BRIEF DESCRIPTION OF THE DRAWINGS

The implementation of this document will be described in detail with reference to the following drawings in which like numerals refer to like elements.

DETAILED DESCRIPTION

According to the present invention, there is suggested a local wireless communication system and method that uses spectrum sensing to secure a channel for local wireless communication between each of a plurality of sensors and a hub over a sensor network including the sensors and the hub.

It should be noted that each communication subject in the local wireless communication system according to the present invention is not limited to the hub and the sensors, but may include any devices that may perform communications. Hereinafter, communication between a hub and each of sensors will be described as exemplary embodiments.

In an exemplary embodiment, a predefined bandwidth is divided into a plurality of channels. The plurality of channels is scanned to find out unused channels for the purpose of communication.

In this exemplary embodiment, particularly when a hub repetitively transmits information to at least one sensor and the sensor intermittently wakes up to receive the information from the hub (for example, when the hub transmits wireless widgets, timing sync. Information, and location information to the sensor), the hub secures a channel available in a band and sends the information over the secured channel, and then the sensor wakes up by the channel signal transmitted from the hub to receive the signal.

The sensor determines whether to use the channels from the received signals through a frequency-variable receiving type channel envelop rectifying circuit (hereinafter, simply referred to as "frequency-variable detecting unit"). This allows for high speed spectrum sensing with reduced cost and power consumption.

In particular, the frequency-variable detecting unit, which determines whether to use a channel, operates only when there is any input signal carried over a frequency channel corresponding thereto. By doing so, power consumption of the sensor may be reduced.

Further, only when there is a signal in the band, a band detector allows the sensor to wake up to receive a signal carried on each channel.

Hereinafter, exemplary embodiments will be described in greater detail with reference to accompanying drawings.

Figure 1:
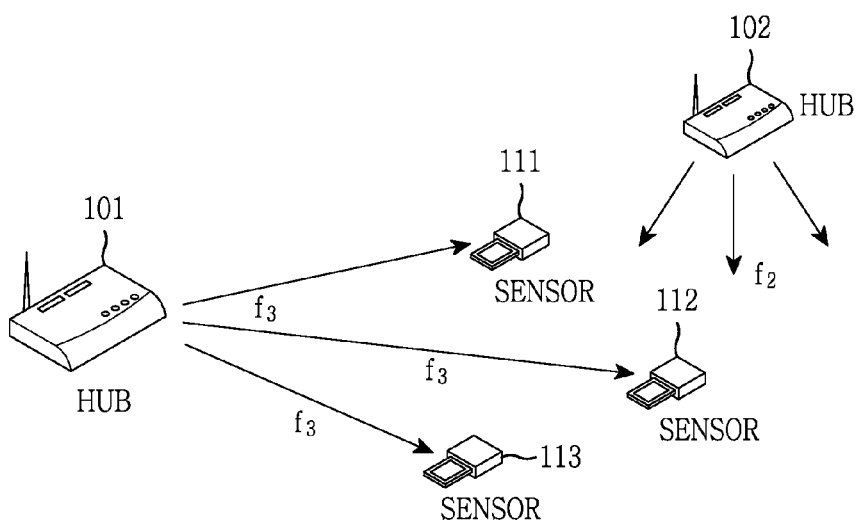
FIG. 1 is a view schematically illustrating a local wireless communication system according to an exemplary embodiment of the present invention.

FIG. 1 is a view schematically illustrating a local wireless communication system according to an exemplary embodiment of the present invention. Referring to FIG. 1, the local wireless communication system may include a plurality of hubs 101 and 102, and a plurality of sensors 111, 112, and 113.

The hub 101 is located near the sensors 111, 112, and 113 (for example, on the order of 10 m to 30 m) to communicate with each of the sensors 111, 112, and 113. In particular, the present invention may apply to the case where the hub 101 repetitively transmits information and the sensors 111, 112, and 113 randomly wake up and receive the information.

Meanwhile, the hub 101 should use a channel not preoccupied by the other hub 102 or sensors to avoid interference and perform normal communications. For example, when the hub 102 uses frequency channel f2, the hub 101 should use one of frequency channels currently unused (e.g., f3) for data transmission.

Figure 2:
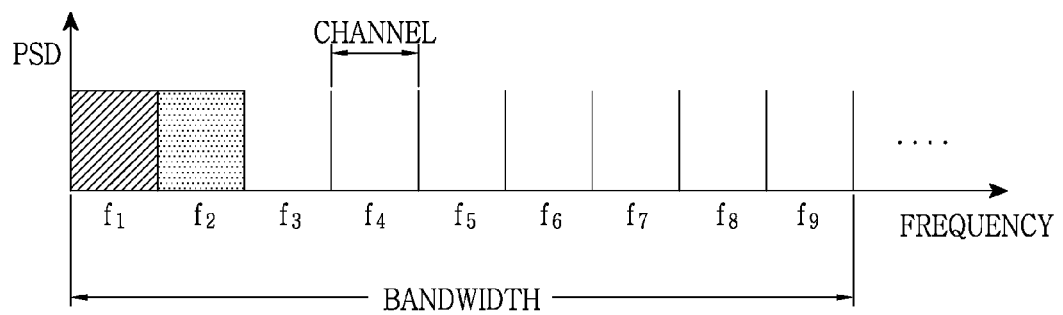
FIG. 2 is a view schematically illustrating a band and channels used in an exemplary embodiment of the present invention.

FIG. 2 is a view schematically illustrating a band and channels used in an exemplary embodiment of the present invention. Referring to FIG. 2, the hubs 101 and 102 and the sensors 111, 112, and 113 as shown in FIG. 1 may use a predefined frequency band within a local area.

In this exemplary embodiment, the band may be an unlicensed frequency band such as ISM (Industrial Scientific Medical) band.

The unlicensed frequency band is primarily allocated for low-power wireless devices that do not require any permission for use. Communication devices employing this frequency band may be used only under the condition of approving interference with ISM devices. Accordingly, a communication device may conduct normal communications over an unlicensed frequency band only when the unlicensed frequency band (or a channel included in the band) is not occupied by other communication devices.

As shown in FIG. 2, the predefined band may be divided into a plurality of channels. Each communication device may select a certain one among the plurality of channels and transmit data through the selected channel over the local communication network. As described above, since each device fails to perform normal communications when using the same frequency channel as that of the others, each channel is subjected to a spectrum sensing in order to determine whether or not the channel is used and then secure any available frequency channel. In this exemplary embodiment, frequency sensing is implemented by a frequency-variable detecting unit, whose detailed descriptions will be made later.

The structures of the sensor and hub according to exemplary embodiments will now be described in more detail with reference to FIGS. 3 to 5.

Figure 3:
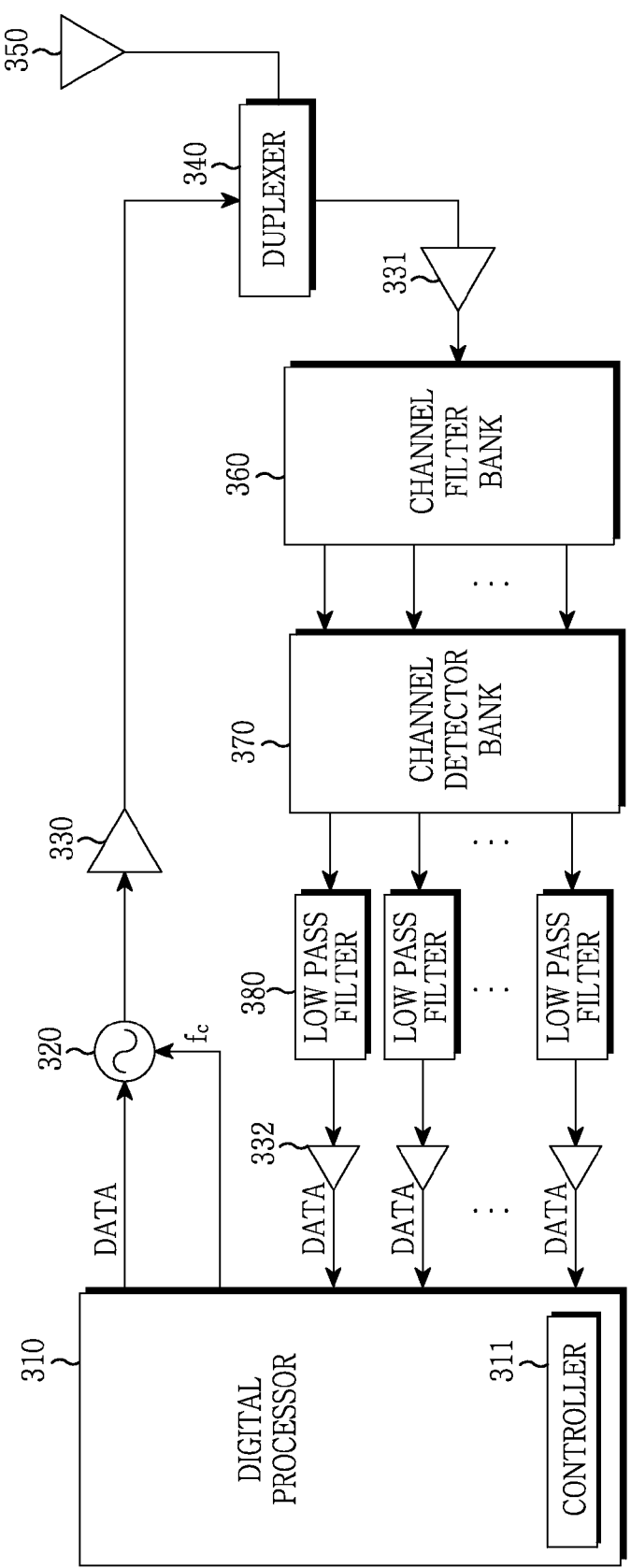
FIG. 3 is a block diagram illustrating a detailed structure of a hub according to an exemplary embodiment of the present invention.

FIG. 3 is a block diagram illustrating a detailed structure of a hub according to an exemplary embodiment of the present invention.

Referring to FIG. 3, a hub according to an exemplary embodiment of the present invention may include a digital processor 310, an oscillator 320, a plurality of amplifiers 330, 331, and 332, a duplexer 340, an antenna 350, a channel filter bank 360, a channel detector bank 370, and a plurality of low pass filters ("LPFs") 380. The digital process may include a controller 311 that generates various control signals.

The hub repetitive transmits information to at least sensor located within coverage for local communication. The sensor randomly wakes up to receive the information from the hub. An example of such information may include wireless widgets, timing sync. information, and location information.

Upon transmitting information, the hub identifies any unused channels contained in a band. For this purpose, the hub checks signals that are received by the antenna 350 and carried on channels included in the band.

More specifically, signals received through the antenna 350 are inputted to the channel filter bank 360 via the duplexer 340 and the amplifier 331. The channel filter bank 360 may have filters (not shown) as many as the number of the channels divided in the band-Each filter performs filtering of only the signal of a corresponding channel among the inputted signals. The channel detector bank 370 may include a plurality of signal detectors (not shown), each allocated for each channel. The channel detector bank 370 receives a signal filtered correspondingly to each channel filter of the channel filter bank 360. The corresponding channel signal detected by the signal detector for each channel included in the channel detector bank 370 is inputted through the LPF 380 and the amplifier 332 to the digital processor 310.

The digital processor 310 determines whether to use each channel on which each signal is carried and selects a channel currently unused as a transmission channel. Data subjected to transmission is modulated by the oscillator 320 to comply with the frequency of the determined channel and then transmitted to the sensor via the amplifier 330, the duplexer 340, and the antenna 350. In this case, since the data transmitted from the hub generally has a low data rate, digital amplitude modulation such as OOK (On Off Keying) or ASK (Amplitude Shift Keying) may be employed as its modulation scheme. If so, an output signal from the hub may be shaped as a digital pulse.

Figure 6:
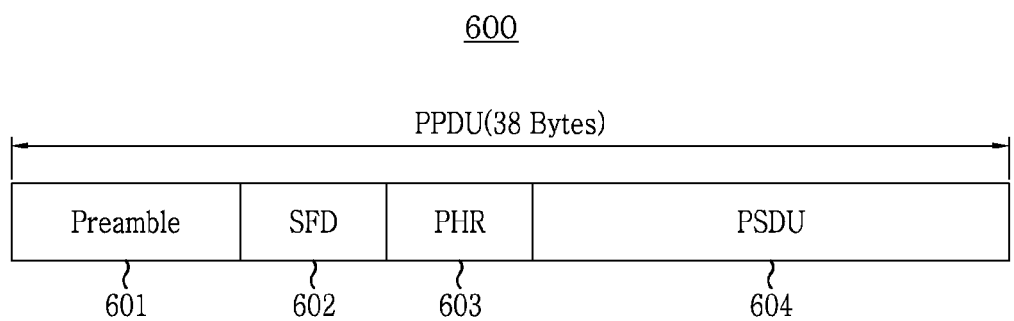
FIG. 6 is a view illustrating a structure of a transmission packet according to an exemplary embodiment.

Transmission data from the digital processor 310 may be packet-type digital data as shown in FIG. 6. Referring to FIG. 6, the transmission packet 600 may be implemented in the form of PPDU (Physical Protocol Data Unit) that includes data fields of a preamble 601, an SFD (Start of Frame Delimiter) 602, a PHR (PHY header) 603, and a PSDU (PHY Service Data Unit) 604.

The preamble 601 and the SFD 602 enable a packet symbol to be synchronized at a receiving side. The PHR 603 includes a length value of the PSDU 604 that is data information actually subjected to transmission.

It may be configured so that both the preamble 601 and the PSDU 604 are inevitably included in the transmission packet 600, but the SFD 602 or the PHR 603 is selectively included in the transmission packet 600. It should be noted that the data packet shown in FIG. 6 is merely an example and other various types of data packets are available.

As described above, the channel filter bank 360 and the channel detector bank 370 may be replaced by the frequency-variable detecting unit used for the sensor shown in FIG. 4, as will be described later and shown in FIG. 5. Further, the oscillator 320 for modulation of signals to be subjected to transmission may be replaced by a VCO bank having VCOs as many as the number of channels, as shown in FIG. 5.

Figure 4:
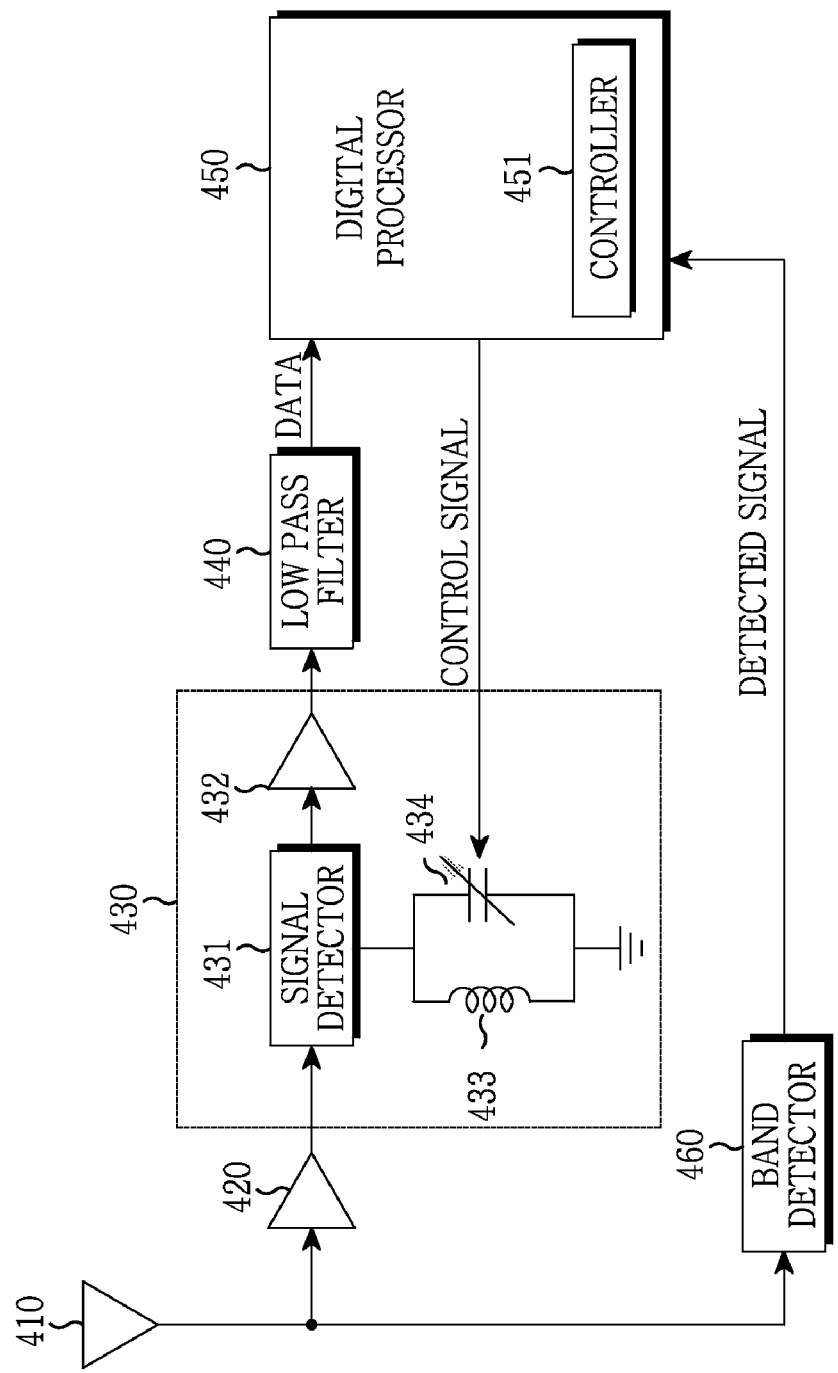
FIG. 4 is a block diagram illustrating a detailed structure of a sensor according to an exemplary embodiment of the present invention.

FIG. 4 is a block diagram illustrating a detailed structure of a sensor according to an exemplary embodiment of the present invention. Referring to FIG. 4, the sensor may include an antenna 410, an amplifier 420, a frequency-variable detecting unit 430, a low pass filter ("LPF") 440, a digital processor 450, and a band detector 460. The digital processor 450 may include a controller 451 that generates various control signals. The frequency-variable detecting unit 430 may include a signal detector 431, an amplifier 432, a variable condenser 434, and a coil 433.

As described above, a signal transmitted from the hub is received through the antenna 410. The received signal is inputted to the band detector 460, which in turn supply power to the digital processor 450 to turn on the digital processor 450 in a case where the received signal is a signal belonging to a corresponding band. More specifically, the signal received by the band detector 460 in real time passes through the band detector 460 to serve as power of the digital processor 450 if the received signal is one included in a frequency band for communication between the hub and the sensor over the sensor network.

That is, the sensor under a "dormant" state wakes up when receiving a signal of a corresponding band through the band detector 460 and starts operation.

That is, the controller 451 of the digital processor 450 supplies a control signal to the frequency-variable detecting unit 430. The control signal, which may be a DC (Direct Current) signal, is supplied to the variable condenser 434 included in a resonator (that is, an LC circuit)-the resonator belongs to the frequency-variable detecting unit 430 and is composed of the variable condenser 434 and the coil 433. The control signal causes a resonant frequency in the resonator. The signal detector 431 detects a channel signal corresponding to the resonant frequency.

That is, the controller 451 sequentially adjusts the magnitude of a DC voltage of a control signal generated to control the capacitance C of the variable condenser 434 included in the frequency-variable detecting unit 430, the resonator generates a resonant frequency according to the capacitance C, and the signal detector 431 sequentially rectifies all channels in a band until a channel is secured.

The signal detector 431, which may be a capacitance-variable element such as a varactor diode, detects a signal carried on the frequency channel according to a variable resonant frequency of the resonator. The detected signal is inputted to the digital processor 450 via the amplifier 432 and the LPF 440.

Although it has been exemplified in FIG. 4 that the frequency-variable detecting unit 430 is implemented by the amplifier 432, the resonator (consisting of the variable condenser 434 and the coil 433) and the signal detector 431, this exemplary embodiment is not limited thereto. For example, the frequency-variable detecting unit 430 may be realized as a signal detector including a variable resonator. In this case, the frequency-variable detecting unit 430 may detect a signal only at a specific resonant frequency (channel) among varying resonance frequencies. That is, the frequency-variable detecting unit 430 operates only when a signal is inserted into the frequency-variable detecting unit 430 while carried on the specific channel.

If there is any received signal carried on the channel, the frequency-variable detecting unit 430 outputs the received signal, but if no (for example, in a case where a noise signal only exists), the frequency-variable detecting unit 430 outputs no signals. This allows for improved sensitivity and more rapid determination on whether to use a channel in comparison with using a general variable channel filter. In addition, this may provide an advantage that may simultaneously perform determination on whether to use a channel and signal demodulation.

The digital processor 450 determines whether to use each channel depending on the result processed by the frequency-variable detecting unit 430. If there is a signal on a specific channel and thus a signal is outputted from the frequency-variable detecting unit 430, then the digital processor 450 analyzes the header of packet data received on the channel (that is, preamble 601). If it is identified that the signal has a designated code, the digital processor 430 starts receiving and processing the signal. If there is any signal received through the corresponding channel but the received signal does not have the designated code, the sensor stops its operation.

On the other hand, if it is identified that there exists a signal outputted from the frequency-variable detecting unit 430, however, the signal is not valid (for example, in cases where the output signal has abnormal amplitude or different signal pattern from a predetermined one), the sensor stops its operation without further process.

Figure 5:
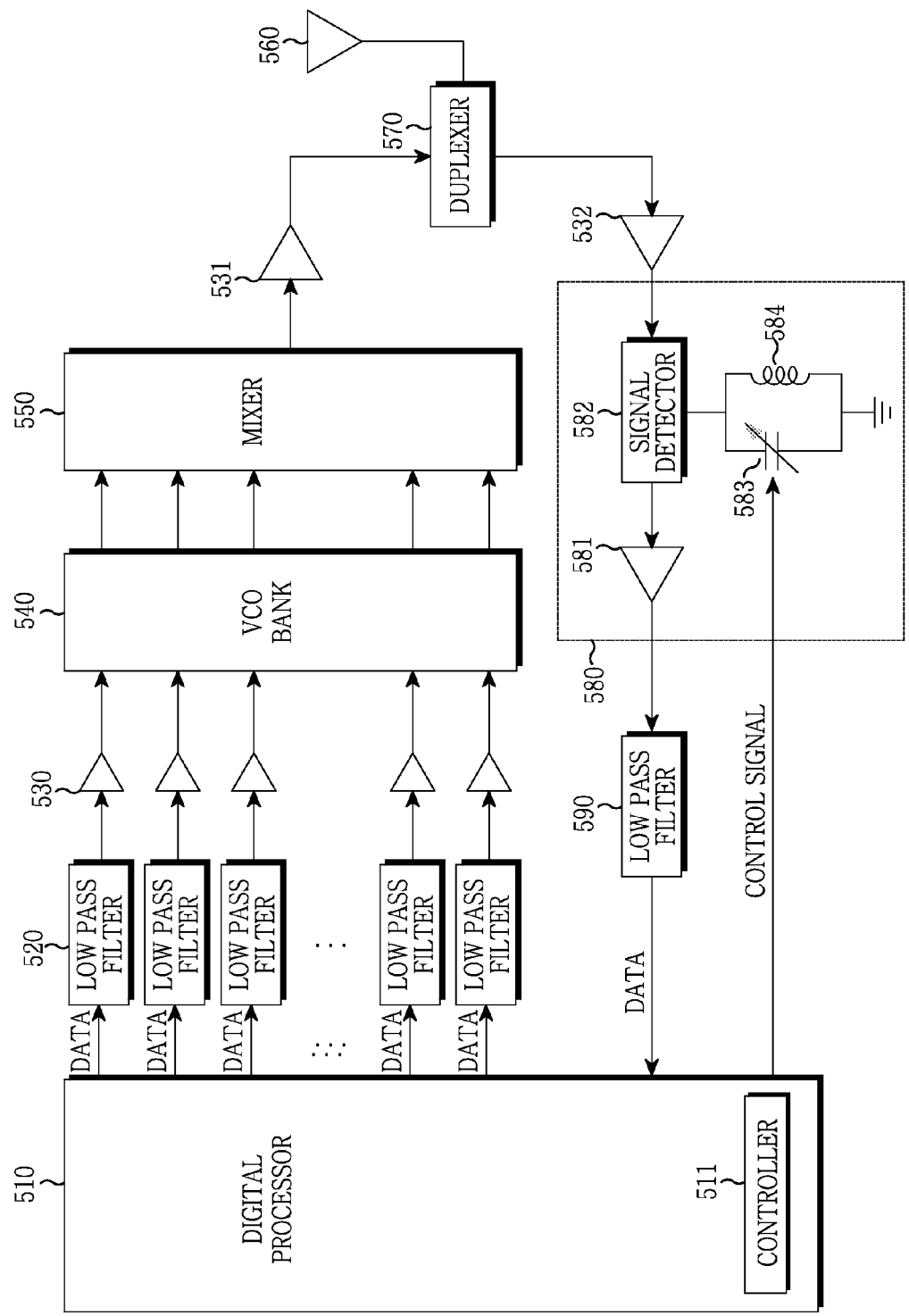
FIG. 5 is a block diagram illustrating a detailed structure of a hub according to another exemplary embodiment of the present invention.

FIG. 5 is a block diagram illustrating a detailed structure of a hub according to another exemplary embodiment of the present invention. The hub as shown in FIG. 5 may be a variation to that shown in FIG. 3.

For example, the receiving side, i.e., the channel filter bank 360, having channel filters as many as the number of channels, and the channel detector bank 370, as shown in FIG. 3, may be replaced by the frequency-variable detecting unit used for the sensor shown in FIG. 4. Further, the transmission side, i.e., the oscillator 320 for modulation of signals to be subjected to transmission may be replaced by a VCO bank 540 and a mixer 550 as shown in FIG. 5.

Accordingly, the hub as shown in FIG. 5 may simultaneously transmit information through a plurality of channels.

More specifically, when the hub transmits information, a controller 511 supplies a control signal to a frequency-variable detecting unit 580. The control signal, which may be a DC (Direct Current) signal, is supplied to a variable condenser 583 of a resonator consisting of the variable condenser 583 and a coil 584 (that is, LC circuit) as included in the frequency-variable detecting unit 580. Following the control signal, the resonator causes a resonant frequency and a signal detector 582 detects a channel signal corresponding to the resonant frequency.

That is, the controller 511 sequentially adjusts the magnitude of a DC voltage of a control signal generated therefrom to control the capacitance C of the variable condenser 583 included in the frequency-variable detecting unit 580, the resonator generates a resonant frequency according to the capacitance C, and the signal detector 582 sequentially rectifies all channels in a band until a channel is secured.

The signal detector 582, which may be a capacitance-variable element such as a varactor diode, detects a signal carried on the frequency channel according to a variable resonant frequency of the resonator. The detected signal is inputted to the digital processor 510 via the amplifier 581 and the LPF 590. The spectrum-sensed signal has a constant magnitude depending on whether or not there is a signal received on the channel, as shown in FIG. 7.

Figure 7:
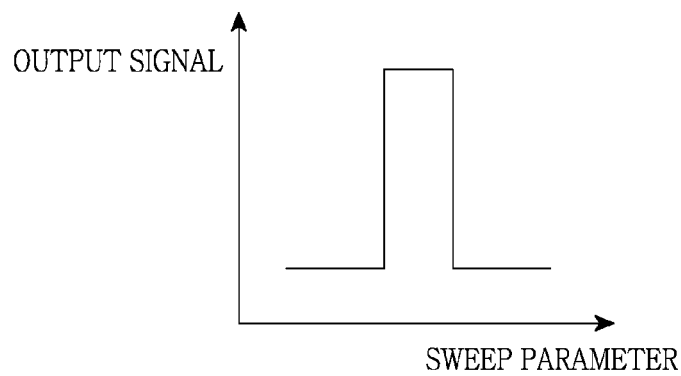
FIG. 7 is a graph illustrating an output signal depending on a variation to a resonant frequency by parameter sweep for variable detection of a sensor according to an exemplary embodiment of the present invention.

FIG. 7 is a graph illustrating an output signal depending on a variation to a resonant frequency by parameter sweep for variable detection of a sensor according to an exemplary embodiment of the present invention. Referring to FIG. 7, in a case where there is a signal carried on a channel according to the parameter sweep, the frequency-variable detecting unit 430 outputs a rectified signal of constant amplitude, and otherwise, no signals.

The digital processor 510 determines whether to use each channel on which each signal is carried and selects a channel currently unused as a transmission channel. Data subjected to transmission is transmitted to the VCO bank 540 via the LPF 520 and the amplifier 530. The VCO bank 540 modulates the data through VCO of available channel. The modulated data is mixed to other signals of different frequencies by the mixer 550, and then transmitted to each sensor via the amplifier 531, the duplexer 570, and the antenna 560. In this case, since the data transmitted from the hub generally has a low data rate, digital amplitude modulation such as OOK (On Off Keying) or ASK (Amplitude Shift Keying) may be employed as its modulation scheme.

As described above with reference to FIG. 3, the hub may be configured to spectrum-scan a plurality of channels included in the band to transmit only a signal carried on a corresponding channel. Since the hub may have a further complicated structure in comparison with the sensor, the hub may be configured to have a separate transmitter for each channel as shown in FIG. 5.

The operation of the hub and sensor according to exemplary embodiments will now be described with reference to FIGS. 8 and 9.

Figure 8:
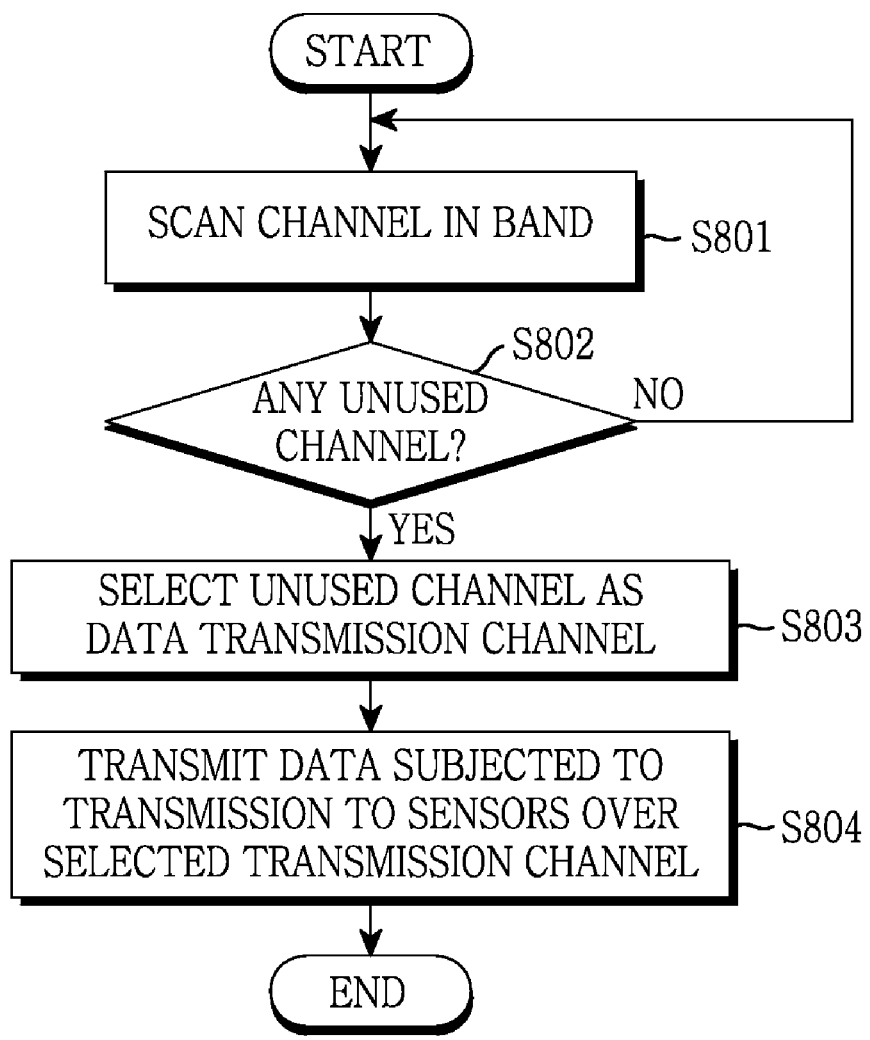
FIG. 8 is a flowchart illustrating a data transmission procedure in a hub according to an exemplary embodiment of the present invention.

FIG. 8 is a flowchart illustrating a data transmission procedure in a hub according to an exemplary embodiment of the present invention. Referring to FIG. 8, upon transmission of data, the hub first identifies whether there is a channel available in a band through a spectrum sensing method according to an exemplary embodiment.

More specifically, the hub sequentially scans a plurality of channels included in a band S801 to identify whether the channels are preoccupied by other hubs or sensors. If it is determined that an unused channel available exists S802, the hub selects the unused channel as a data transmission channel S803 and sends data subjected to transmission to sensors over the selected transmission channel S804.

In this case, the scanning and identification of the available channel may be conducted by the frequency-variable detecting unit according to the exemplary embodiment as described above with reference to FIG. 5. If the hub is implemented by the channel filter bank, having filters as many as the number of channels, and the channel detector bank, as shown in FIG. 3, the whole channels in the band may be simultaneously determined, thus removing necessity of spectrum sensing.

Figure 9:
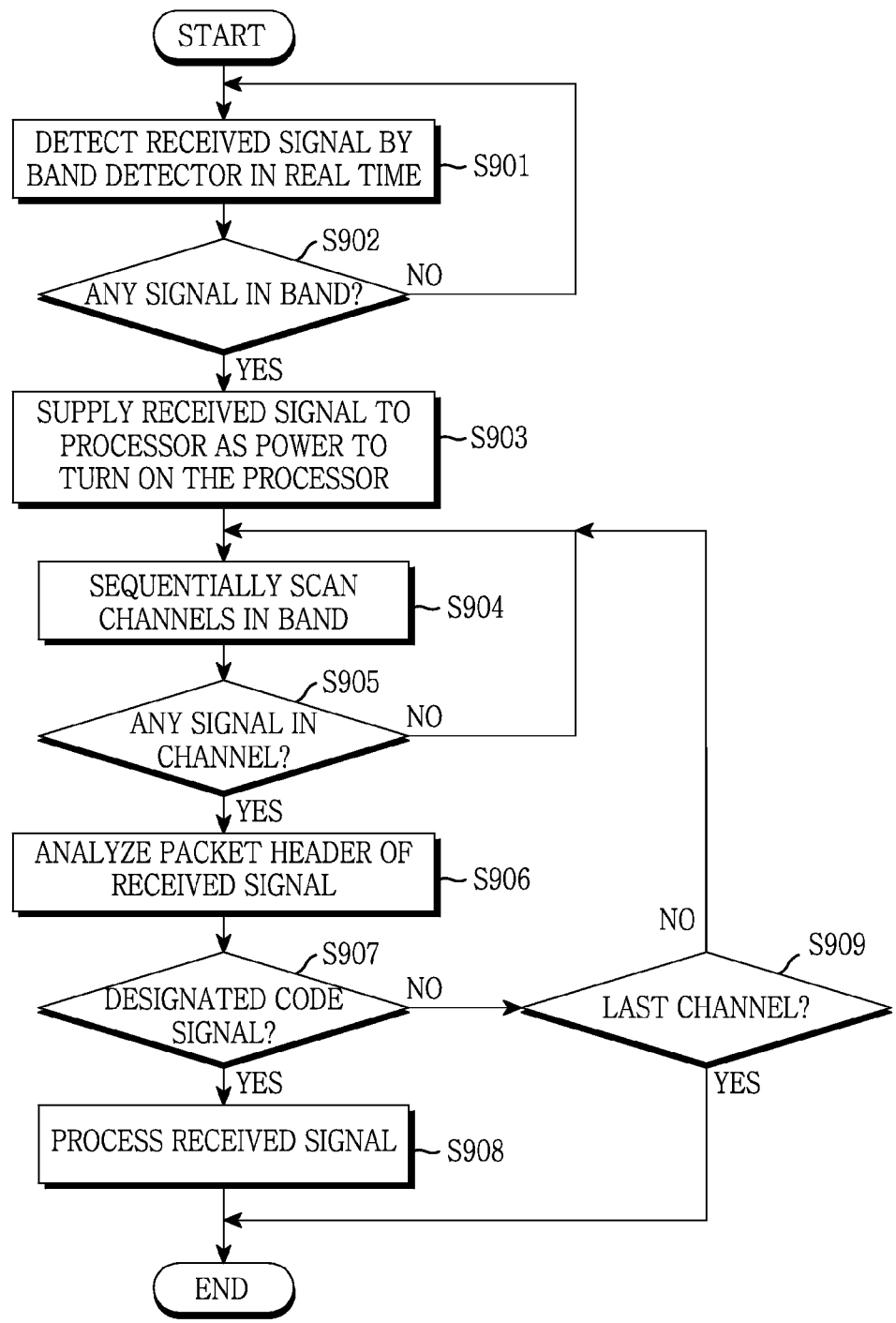
FIG. 9 is a flowchart illustrating a data receiving procedure in a hub according to an exemplary embodiment of the present invention.

FIG. 9 is a flowchart illustrating a data receiving procedure in a hub according to an exemplary embodiment of the present invention. Referring to FIG. 9, a signal transmitted from the hub on a specific channel in a band, as shown in FIG. 8 is received and processed by the sensor.

First, the sensor detects a signal received in real time through the band detector S901. If it is determined that there is a signal belonging to the band S902, then the received signal is supplied to the processor as power to turn on the process S903.

Accordingly, the sensor wakes up to scan the channels included in the band S904. That is, the sensor performs filtering on the received signal belonging to the band for each channel. Thereafter, the sensor rectifies the received signal filtered for each channel through the signal detector and then determines the received signal for each channel at base band.

If it is determined that any signal is present on a channel S905, the packet header of the received signal is analyzed S906. If the analysis shows the signal is a valid communication signal S907, the hub starts to process the received signal S908, and otherwise determines whether the channel is the last channel S909.

If not, then the routine returns to step S904 and then scans the next channel, and if last channel, the routine ends and the sensor stops its operation.

As such, the sensor remains a dormant state without operation until a signal of a corresponding band is detected by the band detector. This sensor network may effectively apply to a case where a hub repetitive transmits information to sensors, for example, where wireless widgets, timing sync. Information, and location information are transmitted to a plurality of sensors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for performing a local wireless communication using a predetermined frequency band, the system employing frequency-variable signal detection, wherein at least a part of the predetermined frequency band is divided into a plurality of channels, the system comprising:
at least a hub scanning each channel to identify available one of the plurality of channels, modulating data, and transmitting the modulated data over the available channel; and
a plurality of sensors communicating with the hub, each sensor being set to start to operate when each sensor detects a signal in said predetermined frequency band, spectrum-sensing the signal of the frequency band for each channel, analyzing a header of packet data for each channel, and receiving and processing the packet data if the signal is identified to have a designated code,
each sensor including a band detector, a processor, and a frequency-variable detecting unit, wherein:
the band detector detects in real time a frequency band of a signal received from the hub, and
only when the frequency band of the received signal is detected by the band detector to be within said predetermined frequency band,
the band detector outputs the received signal to the baseband processing unit and
the processor, upon receipt of the signal outputted from the band detector, starts to operate, transmits a control signal to the frequency-variable detecting unit, analyzes a header of packet data for each channel, and receives and processes the packet data if the signal is identified to have a designated code.

2. The system of claim 1, wherein the frequency-variable detecting unit detects, among the received signal within said predetermined frequency band, a channel signal which corresponds to a resonant frequency generated according to the control signal.

3. The system of claim 1, wherein the header is a preamble of the packet data.

4. A local wireless communication method employing frequency-variable signal detection, in which at least one hub performs local wireless communications with a plurality of sensors at a predetermined frequency band, the method comprising:
dividing at least a part of the frequency band into a plurality of channels;
detecting a signal over each channel in the frequency band to identify whether to use each channel when the hub transmits data to at least one sensor;

if it is identified there is an available unused channel, selecting the unused channel as a data transmission channel;

modulating data subjected to transmission;

transmitting the modulated data to the sensors over the transmission channel;

after transmitting the data to the sensors, detecting in real time a received signal by a band detector of the sensor;

only when a frequency band of the received signal is detected by the band detector to be within a corresponding frequency band at which a signal is transmitted and received between the hub and the sensor, supplying the received signal to a processor of the sensor as power to turn on the processor;

scanning the received signal within the corresponding frequency band for each channel of the plurality of divided channels through a spectrum sensing method to detect a signal for each channel;

generating a control signal and transmitting the control signal to a frequency-variable detecting unit; and analyzing a header of packet data from the signal detected for each channel, and, if the signal is identified to have a designated code, receiving and processing the packet data.

5. The method of claim 4, wherein said identifying whether to use each channel includes, receiving the generated control signal to generate a resonant frequency, and detecting a channel signal that corresponds to the generated resonant frequency.

6. The method of claim 5, wherein the resonant frequency is generated by a resonator as a variable resonant frequency, and said detecting the channel signal includes detecting a signal carried on a corresponding frequency channel according to the variable resonant frequency of the resonator by the control signal.

7. The method of claim 4, wherein the header is a preamble of the packet data.

* * * * *